(12) United States Patent
Jun et al.

(10) Patent No.: US 12,555,835 B2
(45) Date of Patent: Feb. 17, 2026

(54) METHOD FOR CHARGING AND DISCHARGING SECONDARY BATTERY

(71) Applicant: LG ENERGY SOLUTION, LTD., Seoul (KR)

(72) Inventors: Chan Soo Jun, Daejeon (KR); Jong Hyun Chae, Daejeon (KR); Young Jae Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 591 days.

(21) Appl. No.: 18/022,935

(22) PCT Filed: Dec. 23, 2021

(86) PCT No.: PCT/KR2021/019765
§ 371 (c)(1),
(2) Date: Feb. 23, 2023

(87) PCT Pub. No.: WO2022/154309
PCT Pub. Date: Jul. 21, 2022

(65) Prior Publication Data
US 2023/0318056 A1    Oct. 5, 2023

(30) Foreign Application Priority Data
Jan. 15, 2021    (KR) .................. 10-2021-0006098

(51) Int. Cl.
*H01M 10/44*    (2006.01)
*H01M 4/04*    (2006.01)
(Continued)

(52) U.S. Cl.
CPC ....... *H01M 10/446* (2013.01); *H01M 4/0445* (2013.01); *H01M 4/0459* (2013.01);
(Continued)

(58) Field of Classification Search
CPC ............ H01M 10/446; H01M 10/052; H01M 10/0525; H01M 4/0445; H01M 4/0459;
(Continued)

(56) References Cited

U.S. PATENT DOCUMENTS

2014/0310951 A1    10/2014    Grant et al.
2016/0259012 A1    9/2016    Sejima et al.
(Continued)

FOREIGN PATENT DOCUMENTS

AU    2016201173 A1    9/2016
CN    109390578 A    2/2019
(Continued)

OTHER PUBLICATIONS

Kim et al., "Controlled Prelithiation of Silicon Monoxide for High Performance Lithium-Ion Rechargeable Full Cells", Nano Letters, vol. 16, No. 1, Dec. 22, 2015, XP055558866, pp. 282-288.
(Continued)

*Primary Examiner* — David V Henze-Gongola
(74) *Attorney, Agent, or Firm* — Birch, Stewart, Kolasch & Birch, LLP

(57) ABSTRACT

Methods for charging and discharging a secondary battery are disclosed, which includes: pre-lithiating a negative electrode comprising a silicon-based active material; preparing a secondary battery including the pre-lithiated negative electrode, a positive electrode, a separator, and an electrolyte; and electrochemically charging and discharging the secondary battery with at least one cycle, wherein the electrochemical charging and discharging of the secondary battery is performed so that a difference between a charge SOC and a discharge state of charge (SOC) of the pre-lithiated negative electrode is 18% to 32%.

11 Claims, 5 Drawing Sheets

(51) Int. Cl.
  *H01M 4/1391*   (2010.01)
  *H01M 4/38*     (2006.01)
  *H01M 10/052*   (2010.01)
  *H01M 10/42*    (2006.01)

(52) U.S. Cl.
  CPC ......... *H01M 4/1391* (2013.01); *H01M 4/386* (2013.01); *H01M 10/052* (2013.01); *H01M 2010/4292* (2013.01)

(58) Field of Classification Search
  CPC .. H01M 4/1391; H01M 4/386; H01M 4/0452; H01M 4/0461; H01M 4/134; H01M 4/1395; H01M 4/483
  See application file for complete search history.

(56) References Cited

U.S. PATENT DOCUMENTS

| | | |
|---|---|---|
| 2017/0149100 A1 | 5/2017 | Ishii |
| 2018/0040914 A1 | 2/2018 | Grant et al. |
| 2018/0175459 A1 | 6/2018 | Mccalla et al. |
| 2019/0044130 A1 | 2/2019 | Ogata et al. |
| 2020/0235419 A1 | 7/2020 | Chae et al. |
| 2020/0335771 A1 | 10/2020 | Zhang et al. |
| 2021/0265675 A1 | 8/2021 | Mccalla et al. |
| 2021/0384485 A1 | 12/2021 | Chae et al. |
| 2022/0006065 A1 | 1/2022 | Chae et al. |
| 2022/0020976 A1 | 1/2022 | Chae et al. |
| 2023/0145147 A1 | 5/2023 | Mccalla et al. |

FOREIGN PATENT DOCUMENTS

| | | | |
|---|---|---|---|
| CN | 109802109 A | 5/2019 | |
| CN | 110088941 A | 8/2019 | |
| CN | 110858671 A | 3/2020 | |
| JP | 2015-95332 A | 5/2015 | |
| JP | 2015-191853 A | 11/2015 | |
| JP | 2016-511916 A | 4/2016 | |
| KR | 10-2015-0028739 A | 3/2015 | |
| KR | 10-2017-0035565 A | 3/2017 | |
| KR | 10-2017-0074030 A | 6/2017 | |
| KR | 10-2017-0103700 A | 9/2017 | |
| KR | 10-2019-0007296 A | 1/2019 | |
| KR | 10-2019-0143256 A | 12/2019 | |
| KR | 10-2020-0021354 A | 2/2020 | |
| KR | 20200021354 A * | 2/2020 | .......... H01M 4/0459 |
| KR | 10-2020-0041888 A | 4/2020 | |
| KR | 10-2020-0846944 A | 5/2020 | |
| KR | 10-2020-0092643 A | 8/2020 | |
| KR | 10-2020-0095713 A | 8/2020 | |
| KR | 20200095713 A * | 8/2020 | ............ H01M 4/583 |
| WO | WO 2020/085823 A1 | 4/2020 | |

OTHER PUBLICATIONS

Supplementary European Search Report for European Application No. 21919933.8, dated Mar. 14, 2024.
International Search Report (PCT/ISA/210) issued in PCT/KR2021/019765, dated Apr. 7, 2022.

* cited by examiner

[FIG. 1]
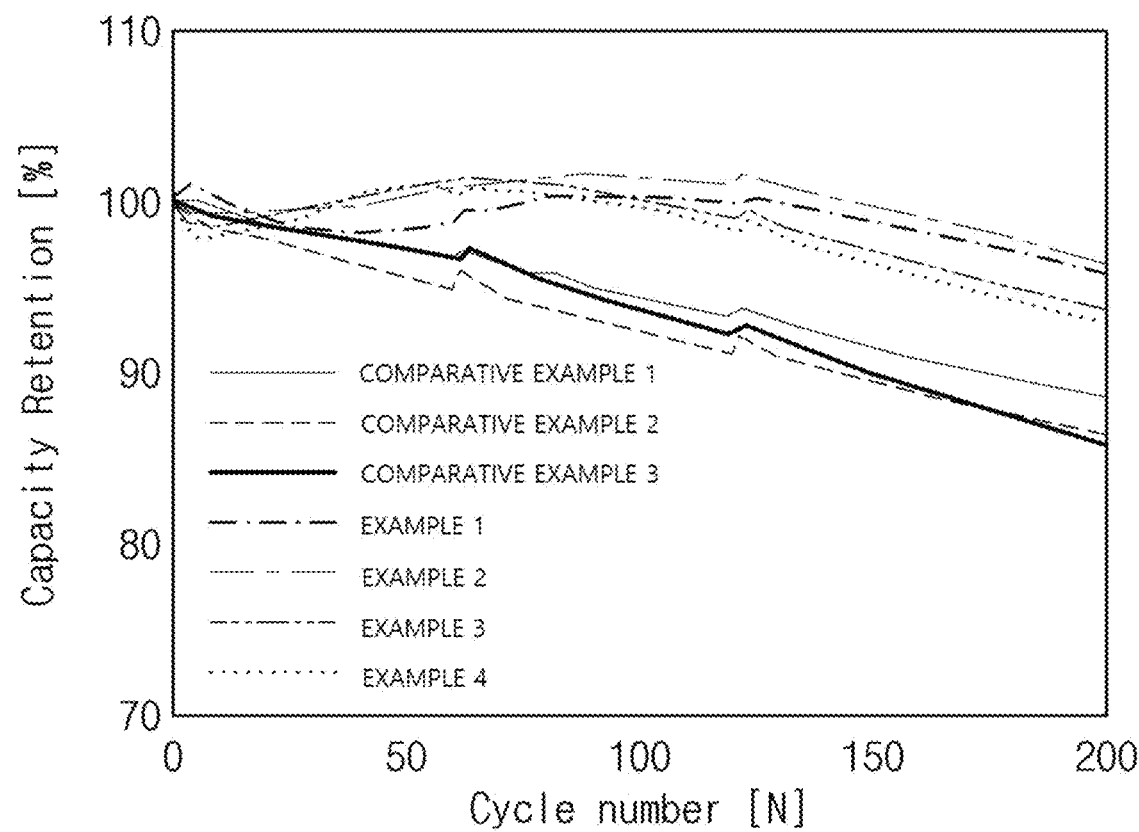

[FIG. 2]
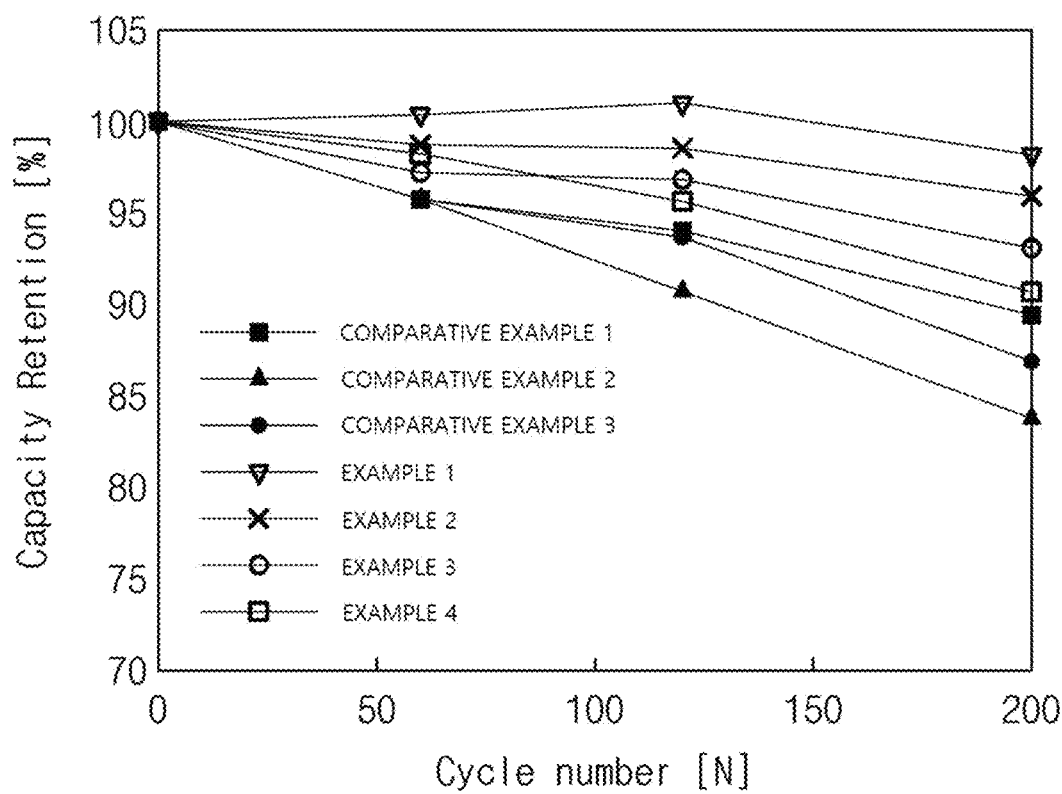

[FIG. 3]
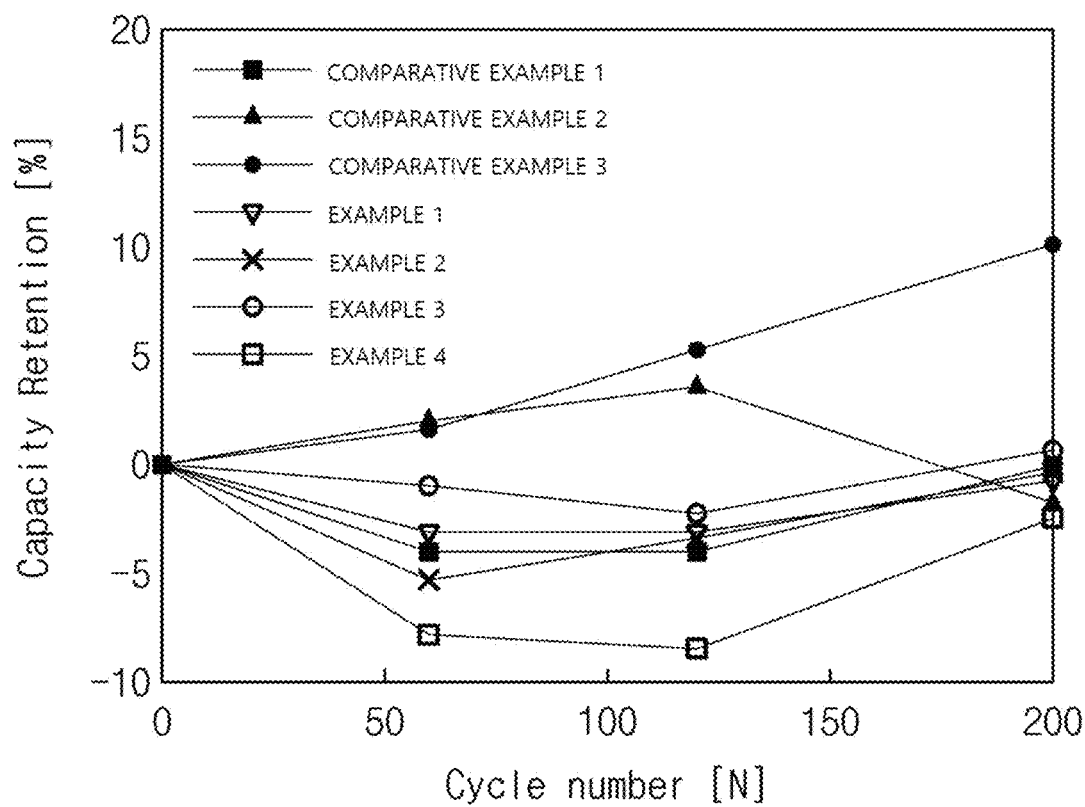

[FIG. 4]
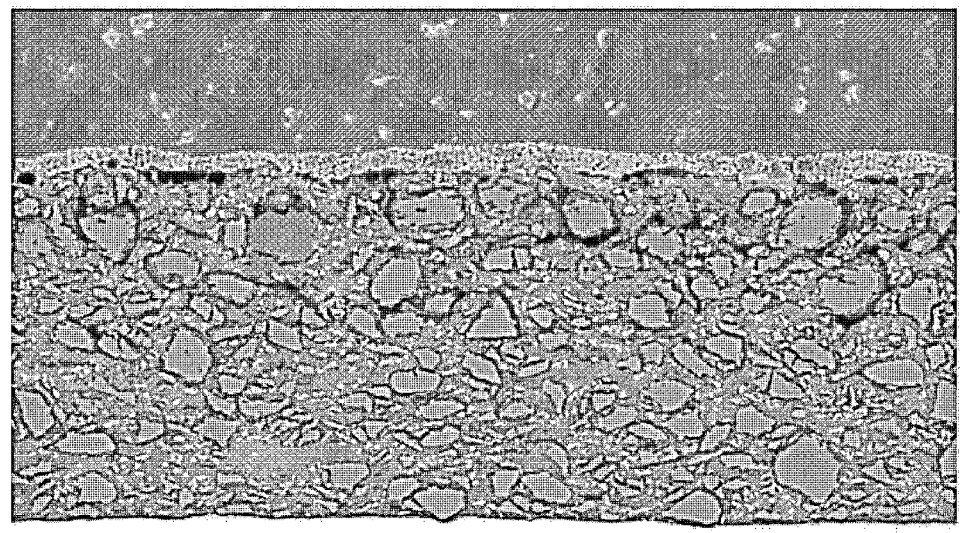

[FIG. 5]
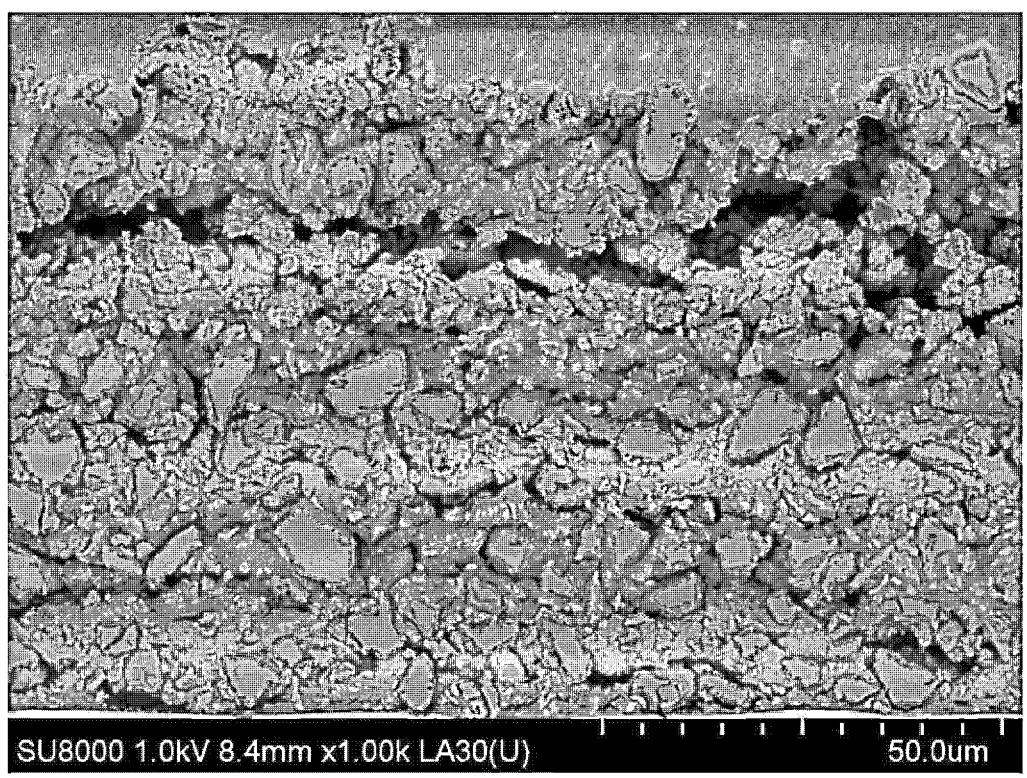

METHOD FOR CHARGING AND DISCHARGING SECONDARY BATTERY

CROSS-REFERENCE TO RELATED APPLICATIONS

This application claims the benefit of Korean Patent Application No. 10-2021-0006098, filed on Jan. 15, 2021, in the Korean Intellectual Property Office, the disclosure of which is incorporated herein in its entirety by reference.

TECHNICAL FIELD

The present invention relates to a method for charging and discharging a secondary battery.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving performance of the lithium secondary battery have been actively conducted.

The lithium secondary battery generally includes a positive electrode, a negative electrode, a separator interposed between the positive electrode and the negative electrode, an electrolyte, an organic solvent, etc. In addition, the positive electrode and negative electrode may have an active material layer including a positive electrode active material and a negative electrode active material, respectively, formed on a current collector. A lithium-containing metal oxide such as $LiCoO_2$ or $LiMn_2O_4$ is generally used as a positive electrode active material in the positive electrode, and thus a carbon-based active material or a silicon-based active material, which does not contain lithium, is used as a negative electrode active material in the negative electrode.

Particularly, among the negative electrode active materials, the silicon-based active material attracts attention in view of having a capacity about 10 times higher than that of the carbon-based active material and has an advantage in that the high capacity makes it possible to achieve high energy density even with a thin electrode. However, the silicon-based active material has the limitation of volume expansion by charge and discharge, thereby reducing life characteristics, and thus is not universally used.

Accordingly, there is a need for development on a secondary battery capable of improving life characteristics while achieving the high capacity and energy density of the silicon-based active material.

Korean Patent Application Laid-open Publication No. 10-2017-0074030 relates to a negative electrode active material for a lithium secondary battery, a method for preparing the same, and a lithium secondary battery including the same, and discloses a negative electrode active material including a porous silicon-carbon composite, but there is a limitation in solving the above-described limitations.

PRIOR ART DOCUMENT

Patent Document

Korean Patent Application Laid-open Publication No. 10-2017-0074030

DISCLOSURE OF THE INVENTION

Technical Problem

An aspect of the present invention provides a method for charging and discharging a secondary battery, the method being capable of significantly improving life performance while preventing a deterioration in performance and the collapse of electrode structure due to the volume expansion of a silicon-based active material, by adjusting a range of state of charge (SOC) in a negative electrode during electrochemically charging and discharging the secondary battery in the charge and discharge or the operation of the secondary battery including a pre-lithiated negative electrode containing the silicon-based active material.

Technical Solution

According to an aspect of the present invention, there is provided a method for charging and discharging a secondary battery, the method comprising: pre-lithiating a negative electrode comprising a silicon-based active material; preparing a secondary battery comprising the pre-lithiated negative electrode, a positive electrode, a separator, and an electrolyte; and electrochemically charging and discharging the secondary battery with at least one cycle, wherein the electrochemical charging and discharging of the secondary battery is performed so that a difference between a charge SOC and a discharge SOC of the pre-lithiated negative electrode is 18% to 32%.

Advantageous Effects

The method for charging and discharging a secondary battery of the present invention is characterized by adjusting a range of SOC in a negative electrode during electrochemically charging and discharging the secondary battery in the charge and discharge or the operation of the secondary battery including a pre-lithiated negative electrode containing the silicon-based active material. According to the method for charging and discharging a secondary battery of the present invention, by using the negative electrode subjected to a pre-lithiation process, the initial efficiency and life performance of the negative electrode may be improved, and by adjusting the level of charging and discharging in the operation of the secondary battery, the life performance of the secondary battery may be significantly improved while preventing a deterioration in performance and the collapse of electrode structure due to the volume expansion of the silicon-based active material.

BRIEF DESCRIPTION OF THE DRAWINGS

FIG. 1 is a graph in which capacity retentions of secondary batteries of Examples 1 to 4 and Comparative Examples 1 to 3 in Experimental Example 1 are evaluated.

FIG. 2 is a graph in which capacity retentions of secondary batteries of Examples 1 to 4 and Comparative Examples 1 to 3 were evaluated in Experimental Example 2 are evaluated.

FIG. 3 is a graph in which resistance increase rates of secondary batteries of Examples 1 to 4 and Comparative Examples 1 to 3 in Experimental Example 3 are evaluated.

FIG. 4 is a photograph in which the cross section of a negative electrode at the 400$^{th}$ cycle of Example 2 in Experimental Example 4 is observed using a scanning electron microscope (SEM).

FIG. 5 is a picture in which the cross section of a negative electrode at the 400$^{th}$ cycle of Comparative Example 3 in Experimental Example 4 is observed using the SEM.

MODE FOR CARRYING OUT THE INVENTION

Terms or words used in the specification and claims should not be interpreted as being limited to a conventional or dictionary meaning, and should be interpreted as the meaning and concept that accord with the technical spirit, based on the principle that an inventor can appropriately define the concept of a term in order to explain the invention in the best way.

The terms used herein are for the purpose of describing exemplary embodiments only and are not intended to limit the present invention. As used herein, the singular forms, "a", "an", and "the" are intended to include the plural forms as well unless the context clearly indicates otherwise.

It will be understood that the terms "include", "comprise", or "have" when used in the specification, specify the presence of stated features, numbers, steps, elements, or combinations thereof, but do not preclude the presence or addition of one or more other features, numbers, steps, elements, or combinations thereof.

In the present specification, an average particle diameter ($D_{50}$) may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a submicron level to a few mm, and may obtain highly repeatable and high-resolution results.

Hereinafter, the present invention will be described in detail.

<Method for Charging and Discharging Secondary Battery>

The present invention relates to a method for charging and discharging a secondary battery or for operating a secondary battery, and particularly, to a method for charging and discharging a lithium secondary battery or for operating a lithium secondary battery.

Specifically, the method for charging and discharging a secondary battery of the present invention is characterized by comprising: pre-lithiating a negative electrode comprising a silicon-based active material; preparing a secondary battery comprising the pre-lithiated negative electrode, a positive electrode, a separator, and an electrolyte; and electrochemically charging and discharging the secondary battery with at least one cycle, wherein the electrochemical charging and discharging of the secondary battery is performed so that a difference between a charge SOC and a discharge SOC of the pre-lithiated negative electrode is 18% to 32%.

Generally, the silicon-based active material is excessively expanded and contracted in the volume by the charge and discharge, and thus the collapse of the negative electrode, structural deformation, and a deterioration in conductive connectivity of the silicon-based active material occur, which may cause a sharp deterioration in life performance of the negative electrode and the secondary battery.

To solve the limitations, the method for charging and discharging a secondary battery of the present invention is characterized by adjusting a range of SOC in the negative electrode during electrochemically charging and discharging the secondary battery in the charge and discharge or the operation of the secondary battery including the pre-lithiated negative electrode containing the silicon-based active material. According to the method for charging and discharging a secondary battery of the present invention, by using the negative electrode subjected to the pre-lithiation process, the initial efficiency and life performance of the negative electrode may be improved, and by adjusting the level of charging and discharging in the operation of the secondary battery, the life performance of the secondary battery may be significantly improved while preventing a deterioration in performance and the collapse of electrode structure due to the volume expansion of the silicon-based active material.

<Pre-Lithiation>

The method for charging and discharging a secondary battery of the present invention includes pre-lithiating a negative electrode containing a silicon-based active material.

The negative electrode contains a silicon-based active material, and may preferably exhibit high capacity and energy density of the silicon-based active material while preventing expansion and contraction in the volume of the silicon-based active material by adjusting the SOC range during electrochemically charging and discharging the secondary battery, which will be described below.

The silicon-based active material may comprise a compound represented by Chemical formula 1 below:

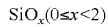  [Chemical formula 1]

$SiO_x(0 \leq x < 2)$

In Formula 1 above, since $SiO_2$ does not react with lithium ions and thus cannot store lithium, x is preferably within the above range.

Specifically, the silicon-based active material may include silicon (Si). Conventionally, Si has an advantage in that Si has a capacity about 2.5-3 times higher than a silicon oxide [e.g., $SiO_x$ (0≤x<2)], but Si has far greater expansion and contraction in the volume by the charge and discharge than the silicon oxide, and thus is not easy to be commercialized.

However, the present invention may effectively solve the limitation of deterioration in life characteristics by adjusting the electrochemical charging range of the secondary battery to the above-described range to thus minimize the volume expansion/contraction of Si, and the advantages of high capacity, energy density, and efficiency characteristics of Si may be more preferably achieved. More specifically, the silicon-based active material may consist of Si.

The average particle diameter ($D_{50}$) of the silicon-based active material may be 0.1 μm to 12 μm, preferably 1.5 μm to 6 μm in terms of enhancing the structural stability of the active material during the charge and discharge and forming a smoother conductive network for maintaining electrical conductivity, or making it easier to access the binder for binding the active material and the current collector.

The negative electrode may include a negative electrode current collector and a negative electrode active material layer disposed on at least one surface of the negative electrode current collector. The negative electrode active material layer may comprise the silicon-based active material.

The negative electrode current collector is not particularly limited so long as it has high conductivity without causing adverse chemical changes in the battery. Specifically, the negative electrode current collector may include at least one selected from the group consisting of copper, stainless steel, aluminum, nickel, titanium, sintered carbon, and aluminum-cadmium alloy, and specifically, may include copper.

The negative electrode current collector may have a thickness of 3 µm to 500 µm, and preferably 5 µm to 50 µm for realizing a thin film of the negative electrode containing the silicon-based active material.

The negative electrode current collector may have microscopic irregularities formed on the surface thereof to enhance the adhesion of the negative electrode active material. For example, the negative electrode current collector may be used in various shapes such as a film, a sheet, a foil, a net, a porous body, a foam body, and a non-woven fabric body.

The negative electrode active material layer may be disposed on at least one surface of the negative electrode current collector. Specifically, the negative electrode active material layer may be disposed on one surface or both surfaces of the negative electrode current collector.

The silicon-based active material may be contained in an amount of 60 wt % or more, specifically 60 wt % to 95 wt %, and preferably 70 wt % to 90 wt % in the negative electrode active material layer in order to sufficiently realize the high capacity of the silicon-based active material in the secondary battery while minimizing the effect of the volume expansion/contraction of the silicon-based active material on the battery.

The negative electrode active material layer may further include a conductive agent and/or a binder together with the silicon-based active material.

The binder may be used to improve the adhesion between the negative electrode active material layer and the negative electrode current collector, or the binding force between the silicon-based active materials.

Specifically, the binder may include at least one selected from the group consisting of styrene butadiene rubber (SBR), acrylonitrile butadiene rubber, acrylic rubber, butyl rubber, fluoro rubber, polyvinyl alcohol, carboxymethyl cellulose (CMC), starch, hydroxypropyl cellulose, regenerated cellulose, polyvinyl alcohol (PVA), polyacrylic acid (PAA), polyethylene glycol (PEG), polyacrylonitrile (PAN), polyacrylate sodium salt (PAA-$Na^+$), and polyacryl amide (PAM), or a copolymer of at least two thereof in order to further improve electrode adhesion, provide sufficient resistance to the volume expansion/contraction of the silicon-based active material, and prevent the collapse of electrode structure.

Preferably, in terms of having high strength, and excellent resistance to the volume expansion/contraction of the silicon-based active material, and providing excellent flexibility to the binder, thereby preventing distortion, bending, and the like of the electrode, the binder may include at least one selected from the group consisting of polyvinyl alcohol, polyacrylic acid, polyacrylonitrile, polyacrylic acid sodium, and polyacrylic amide, or a copolymer of at least two thereof, and preferably may include at least one of polyvinyl alcohol or polyacrylic acid, or a copolymer thereof.

The binder may include Li, Na, or Ca that is substituted for hydrogen in the binder in order to be more easily dispersed in an aqueous solvent such as water, and to more smoothly coat the active material, thereby improving the binding force when a slurry for forming a negative electrode active material layer is prepared.

The binder may be included in the negative electrode active material layer in an amount of 3 wt % to 30 wt %, preferably 5 wt % to 20 wt %, and when the amount is within the range, the binder may better bind the silicon-based active materials to minimize the limitation of the volume expansion of the active material, and at the same time, the binder is easily dispersed when a slurry for forming the negative electrode active material layer is prepared, and coating properties and the phase stability of the slurry may be improved.

The conductive agent is not particularly limited so long as it can be used to assist and improve conductivity in the secondary battery and has conductivity without causing adverse chemical changes. Specifically, the conductive agent may include at least one selected from the group consisting of graphite such as natural graphite or artificial graphite; carbon black such as carbon black, acetylene black, Ketjen black, channel black, furnace black, lamp black or thermal black; a conductive fiber such as a carbon fiber or a metal fiber; a conductive tube such as a carbon nanotube; fluorocarbon; metal powder such as aluminum or nickel powder; a conductive whisker such as a zinc oxide whisker or a potassium titanate whisker; a conductive metal oxide such as a titanium oxide; and a polyphenylene derivative, and may preferably include carbon black in terms of the achievement of high conductivity.

In terms of facilitating the dispersion of the conductive agent when a slurry for forming the negative electrode active material layer is prepared, and further improving electrical conductivity, the conductive agent may have a specific surface area of 80 $m^2$/g to 200 $m^2$/g, and preferably 100 $m^2$/g to 150 $m^2$/g.

The conductive agent may be included in the negative electrode active material layer in an amount of 0.1 wt % to 25 wt %, and preferably 0.1 wt % to 20 wt %, and when the amount of the conductive agent is within the range, it is preferable in that an excellent conductive network may be formed while alleviating the increase in resistance due to the binder.

The negative electrode active material layer may have a thickness of 5 µm to 100 µm, and preferably 10 µm to 50 µm in order to achieve a thin film electrode and a high energy density.

The negative electrode may be prepared by coating a negative electrode current collector with a negative electrode slurry including a negative electrode active material, and optionally a binder, a conductive agent, and a solvent for forming a negative electrode slurry and then drying and rolling the coated negative electrode current collector.

The solvent for forming a negative electrode slurry may include, for example, at least one selected from the group consisting of distilled water, ethanol, methanol, and isopropyl alcohol, and preferably include distilled water in order to facilitate the dispersion of the negative electrode active material, the binder and/or the conductive agent.

The solvent for forming a negative electrode slurry may be included in the negative electrode slurry such that the concentration of a solid content including the negative electrode active material and optionally the binder and the conductive agent is 15-45 wt % in consideration of the viscosity, the coating properties, the dispersibility, and the like of the negative electrode slurry.

Through the pre-lithiation, lithium may be intercalated into the silicon-based active material, thus alloying lithium to the irreversible site of the silicon-based active material to remove the irreversible capacity, and a solid electrolyte interface layer (SEI Layer) may be formed on the silicon-based active material in advance, thereby improving the initial efficiency of the negative electrode and the secondary battery.

The method for pre-lithiating a negative electrode is not particularly limited, and may include, for example, a method for intercalating lithium into the negative electrode by directly contacting the negative electrode with a lithium metal, and a method for intercalating lithium into the negative electrode by electrochemically charging the negative electrode by using a lithium metal as a counter electrode.

Specifically, the negative electrode may be pre-lithiated by a method including steps (a), (b), and (c) below:
(a) disposing and impregnating the negative electrode in the pre-lithiation solution;
(b) disposing a lithium metal in the pre-lithiation solution so as to be spaced apart from the negative electrode; and
(c) electrochemically charging the negative electrode by using the lithium metal as a counter electrode.

Step (a) above is a process for smoothly performing electrochemical charging and pre-lithiation, which will be described below, by impregnating the negative electrode in the pre-lithiation solution.

The pre-lithiation solution may contain a lithium salt and an organic solvent.

The lithium salts may include at least one selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$ and $LiB(C_2O_4)_2$, and preferably include $LiPF_6$.

The organic solvent is not particularly limited so long as it can serve as a medium for performing an electrochemical reaction and for movement of ions, and specifically an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methylethyl carbonate (MEC), ethylmethyl carbonate (EMC), ethylene carbonate (EC), or propylene carbonate (PC); an alcohol-based solvent such as ethyl alcohol or isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; sulfolanes or the like may be used as the organic solvent. Among these, in order to improve the electrochemical stability, a carbonate-based solvent is preferable, and specifically ethylmethyl carbonate (EMC), ethylene carbonate (EC) or the like is more preferable.

The concentration of the lithium salt may be 0.1 M to 3 M, and preferably 0.5 M to 1.5 M with respect to the pre-lithiation solution, and when the concentration is in the range, it is preferable in that the lithium salt is sufficiently dissolved so that lithium ions are smoothly intercalated into the silicon-based active material.

The impregnation may be carried out for 0.5-24 hours, preferably 2-12 hours so that the pre-lithiation, which will be described below, may be stably and uniformly carried out by wetting the negative electrode sufficiently.

Step (b) above is a step for disposing, in the pre-lithiation solution, a lithium metal functioning as a counter electrode to the negative electrode.

The lithium metal may be provided as a counter electrode to the negative electrode during the electrochemical charging.

The lithium metal may be disposed in the pre-lithiation solution so as to be spaced apart from the negative electrode in order to prevent a short circuit phenomenon caused by the direct contact between the lithium metal and the negative electrode during an electrochemical charge, which will be described below.

Step (c) above is a step for pre-lithiating the negative electrode by intercalating lithium into the negative electrode by electrochemically charging the negative electrode by using the lithium metal as a counter electrode.

Since lithium may be intercalated into a negative electrode or a silicon-based active material by the electrochemical charging process, a passivation layer may be formed at a certain level on the surface of the negative electrode and side reactions that may occur on the surface of the negative electrode may occur in advance, and thus when the negative electrode manufactured after the pre-lithiation process is applied to an actual battery, the occurrence of the side reactions may be prevented, the initial efficiency of the negative electrode may be improved, and the effect of improving life performance by the adjustment of a charging range, which will be described below, may be further maximized by the pre-lithiation process.

The electrochemical charging may be performed by using an electrochemical charger/discharger. Specifically, WOCS3000s (manufactured by WonATech Co., Ltd.) may be used as the electrochemical charger/discharger.

The electrochemical charging may be performed at a current density of $0.2$ $mA/cm^2$ to $10$ $mA/cm^2$, specifically, at a current density of $0.5$ $mA/cm^2$ to $3$ $mA/cm^2$, so that the silicon-based active material may be uniformly and stably pre-lithiated.

In the electrochemical charging process, the negative electrode may be pre-lithiated by being electrochemically charged by 5% to 50% of the charge capacity of the negative electrode, and specifically 8% to 20%. It is preferable in that when the electrochemical charging is within the above range, the life performance of the negative electrode may be improved by additional lithium retention, and damage to the silicon-based active material and particle breakage due to the excessive amount of electrochemical charging may be prevented. In this case, the charge capacity of the negative electrode may refer to the charge capacity of the negative electrode before performing the pre-lithiation.

The method for pre-lithiating the negative electrode may further include a step for washing the electrochemically charged negative electrode in addition to steps (a), (b), and (c) above. After the washing process, the electrochemically charged or pre-lithiated negative electrode may be used as a negative electrode of the secondary battery which will be described below.

<Secondary Battery Preparation>

The method for charging and discharging a secondary battery of the present invention includes preparing a secondary battery including the pre-lithiated negative electrode, a positive electrode, a separator, and an electrolyte.

The pre-lithiated negative electrode and a preparation method thereof have been described above.

The positive electrode may face the pre-lithiated negative electrode.

The positive electrode may include a positive electrode current collector and a positive electrode active material layer disposed on at least one surface of the positive electrode current collector.

The positive electrode current collector is not particularly limited so long as it has high conductivity without causing adverse chemical changes in the battery. Specifically, the positive electrode current collector may include at least one selected from the group consisting of copper, stainless steel, aluminum, nickel, titanium, sintered carbon, and aluminum-cadmium alloy, and specifically, may include aluminum.

The positive electrode current collector may typically have a thickness of 3 μm to 500 μm.

The positive electrode current collector may have microscopic irregularities formed on the surface thereof to enhance the adhesion of a positive electrode active material. For example, the positive electrode current collector may be used in various shapes such as a film, a sheet, a foil, a net, a porous body, a foam body, and a non-woven fabric body.

The positive electrode active material layer may be disposed on at least one surface of the positive electrode current collector. Specifically, the positive electrode active material layer may be disposed on one surface or both surfaces of the positive electrode current collector.

The positive electrode active material layer may include the positive electrode active material.

The positive electrode active material is a compound capable of reversibly intercalating and deintercalating lithium, and may specifically include a lithium transition metal composite oxide including lithium and at least one transition metal selected from among nickel, cobalt, manganese, and aluminum.

Specifically, the lithium transition metal composite oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y1}Mn_{Y1}O_2$ (where 0<Y<1), $LiMn_{2-Z}Ni_ZO_4$ (where 0<Z<2), etc.), lithium-nickel-cobalt-based oxide (e.g., $LiNi_{1-Y1}Co_{Y1}O_2$ (where 0<Y1<1), etc.), lithium-manganese-cobalt-based oxide (e.g., $LiCo_{1-Y2}Mn_{Y2}O_2$ (where 0<Y2<1), $LiMn_{2-Z1}Co_{Z1}O_4$ (where 0<Z1<2), etc.), lithium-nickel-manganese-cobalt-based oxide (e.g., $Li(Ni_pCo_qMn_{r1})O_2$ (where 0<p<1, 0<q<1, 0<r1<1, and p+q+r1=1) or $Li(Ni_{p1}Co_{q1}Mn_{r2})O_4$ (where 0<p1<2, 0<q1<2, 0<r2<2, and p1+q1+r2=2), etc.), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), etc.), and any one thereof or a compound of two or more thereof may be included. Among these materials, in terms of the improvement of capacity characteristics and stability of the battery, the lithium transition metal composite oxide may include $LiCoO_2$, $LiMnO_2$, $LiNiO_2$, lithium nickel manganese cobalt oxide (e.g., Li$(Ni_{0.6}Mn_{0.2}Co_{0.2})$ $O_2$, Li $(Ni_{0.5}Mn_{0.3}Co_{0.2})$ $O_2$, Li $(Ni_{0.7}Mn_{0.15}Co_{0.15})$ $O_2$, or $Li(Ni_{0.5}Mn_{0.1}Co_{0.1})O_2$), or lithium nickel cobalt aluminum oxide (e.g., $Li(Ni_{0.8}Co_{0.15}Al_{0.05})O_2$, etc.), and, in consideration of a significant improvement effect due to the control of types and content ratios of components constituting the lithium transition metal composite oxide, the lithium transition metal composite oxide may be $Li(Ni_{0.6}Mn_{0.2}Co_{0.2})O_2$, Li $(Ni_{0.5}Mn_{0.3}Co_{0.2})$ $O_2$, Li $(Ni_{0.7}Mn_{0.15}Co_{0.15})$ $O_2$, Li $(Ni_{0.5}Mn_{0.1}Co_{0.1})$ $O_2$, or the like, and any one thereof or a mixture of two or more thereof may be used.

More specifically, the lithium transition metal composite oxide may include lithium and a transition metal including nickel, cobalt, and manganese, and the life characteristics may be significantly improved by controlling the charge/discharge conditions of the secondary battery according to the present invention.

The positive electrode active material may be included in an amount of 80 wt % to 99 wt %, and preferably, 92 wt % to 98.5 wt % in the positive electrode active material layer in consideration of exhibiting sufficient capacity of the positive electrode active material.

The positive electrode active material layer may further include a conductive agent and/or a binder together with the positive electrode active material as described above.

The binder is a component that assists in the binding between the active material and the conductive agent and in the binding with the current collector, and specifically may include at least one selected from the group consisting of polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene terpolymer (EPDM), a sulfonated EPDM, a styrene-butadiene rubber, and a fluoro rubber, and preferably include polyvinylidenefluoride.

The binder may be included in an amount of 1 wt % to 20 wt %, and preferably, 1.2 wt % to 10 wt % in the positive electrode active material layer in terms of securing sufficient binding force between components such as positive electrode active materials.

The conductive agent is not particularly limited so long as it can be used to assist and improve conductivity in the secondary battery and has conductivity without causing adverse chemical changes. Specifically, the conductive agent may include at least one selected from the group consisting of graphite such as natural graphite or artificial graphite; carbon black such as carbon black, acetylene black, Ketjen black, channel black, furnace black, lamp black or thermal black; a conductive fiber such as a carbon fiber or a metal fiber; a conductive tube such as a carbon nanotube; fluorocarbon; metal powder such as aluminum or nickel powder; a conductive whisker such as a zinc oxide whisker or a potassium titanate whisker; a conductive metal oxide such as a titanium oxide; and a polyphenylene derivative, and preferably include carbon black in terms of the improvement in conductivity.

In terms of facilitating the dispersion of the conductive agent when a slurry for forming the positive electrode material layer is prepared, and further improving electrical conductivity, the conductive agent may have a specific surface area of 80 $m^2/g$ to 200 $m^2/g$, and preferably 100 $m^2/g$ to 150 $m^2/g$.

The conductive agent may be included in an amount of 1 wt % to 20 wt %, and preferably, 1.2 wt % to 10 wt % in the positive electrode active material layer in terms of securing sufficient electrical conductivity.

The thickness of the positive electrode active material layer may be 30-400 μm, and preferably 50-110 μm in order to consider the capacity balance between the negative and positive electrodes and minimize the effect by the volume expansion/contraction of the silicon-based active material in the negative electrode.

The positive electrode may be prepared by coating a positive electrode current collector with a positive electrode slurry including a positive electrode active material, and optionally a binder, a conductive agent, and a solvent for forming a positive electrode slurry and then drying and rolling the coated positive electrode current collector.

The solvent for forming the positive electrode slurry may include an organic solvent such as N-methyl-2-pyrrolidone (NMP), and may be used in an amount such that desirable viscosity is obtained when the positive electrode active material as well as optionally the binder and the conductive agent are included. For example, the solvent for forming the positive electrode slurry may be included in the positive electrode slurry such that the concentration of the solid content including the positive electrode active material as well as optionally the binder and the conductive agent is in a range of 50 wt % to 95 wt %, and preferably, 70 wt % to 90 wt %.

The separator separates the negative electrode and the positive electrode and provides a movement path of lithium ions. Any separator may be used as the separator without particular limitation as long as it is typically used in a lithium secondary battery, and particularly, a separator having excellent moisture-retention ability for an electrolyte as well as low resistance to the transfer of electrolyte ions is preferable. Specifically, a porous polymer film, for example, a porous polymer film prepared from a polyolefin-based polymer such as an ethylene homopolymer, a propylene homopolymer, an ethylene/butene copolymer, an ethylene/hexene copolymer, or an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component, or a polymer material may be used to secure heat resistance or mechanical strength, and the separator having a single layer or multilayer structure may be selectively used.

In addition, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the manufacture of the lithium secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent is preferable, and a mixture of a cyclic carbonate (e.g., ethylene carbonate or propylene carbonate) having high ionic conductivity and high dielectric constant, which may increase charging and discharging performance of the battery, and a low-viscosity linear carbonate-based compound (e.g., ethylmethyl carbonate, dimethyl carbonate, or diethyl carbonate) is more preferable. In this case, the performance of the electrolyte may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery.

Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used as the lithium salt. It is preferable to use the lithium salt in a concentration range of 0.1 M to 2.0 M. When the concentration of the lithium salt is in the above range, the electrolyte may have suitable conductivity and viscosity, thereby exhibiting excellent performance, and lithium ions may effectively move.

An N/P ratio calculated by Equation 1 below of the secondary battery may be 1.5 to 3.5, specifically, 1.7 to 2.5, and more specifically, 1.8 to 2.2.

N/P ratio=discharge capacity per unit area of negative electrode before performing pre-lithiation/discharge capacity per unit area of positive electrode.     [Equation 1]

In the present invention, the expression "discharge capacity per unit area" refers to a discharge capacity per unit area in the first cycle of the negative electrode and the positive electrode before performing the pre-lithiation.

The discharge capacity per unit area of the negative electrode before performing the pre-lithiation may be obtained as follows: A negative electrode sample equal to the negative electrode before performing the pre-lithiation is prepared. Specifically, a half-cell is prepared with the negative electrode sample and a counter electrode (e.g., a lithium metal electrode) facing the negative electrode sample. The discharge capacity measured by electrochemically charging and discharging the half-cell may be divided by the area of the negative electrode sample to obtain the discharge capacity per unit area of the negative electrode before performing the pre-lithiation.

The discharge capacity per unit area of the positive electrode may be obtained as follows: A positive electrode sample equal to the positive electrode used in the secondary battery is prepared. A half-cell is prepared with the positive electrode sample and a counter electrode (e.g., a lithium metal electrode) facing the positive electrode sample. The discharge capacity measured by electrochemically charging and discharging the half-cell may be divided by the area of the positive electrode sample to obtain the discharge capacity per unit area of the positive electrode.

When the N/P ratio of the secondary battery of the present invention is adjusted to the above range, the discharge capacity of the negative electrode is designed to be larger to a certain level than the discharge capacity of the positive electrode, and when lithium from the positive electrode is injected to the negative electrode, the ratio of the lithium to the total silicon-based active materials in the negative electrode may be reduced. Therefore, the use ratio of the silicon-based active material in the negative electrode may be reduced to a certain level, and accordingly, at the entire battery level, a deterioration in life characteristics due to the volume expansion in the negative electrode may be minimized. In addition, the N/P ratio is adjusted to the above-described level, and thus, it is possible to minimize the deterioration in the life characteristics of the battery due to the volume expansion described above, and at the same time, to implement a secondary battery having a high energy density, efficiency characteristics, and capacity characteristics due to the silicon-based active material.

The secondary battery may be manufactured by interposing the separator between the pre-lithiated negative electrode as described above and the positive electrode and then injecting the electrolyte, according to a typical method for manufacturing a secondary battery.

<Charging and Discharging Secondary Battery>

The method for charging and discharging a secondary battery of the present invention includes electrochemically charging and discharging the secondary battery with at least one cycle. In addition, the electrochemical charging and discharging of the secondary battery is performed so that a difference between a charge SOC and a discharge SOC of the pre-lithiated negative electrode is 18% to 32%.

The secondary battery may be operated by the electrochemical charging and discharging. According to the method for charging and discharging a secondary battery of the present invention, by using the pre-lithiated negative electrode as a negative electrode of the secondary battery, the initial efficiency and life performance of the negative electrode may be improved, and at the same time, by adjusting the SOC range of the negative electrode during the charge and discharge of the secondary battery as described above, the life performance of the secondary battery may be significantly improved while preventing a deterioration in performance and the collapse of electrode structure due to the volume expansion of the silicon-based active material. Particularly, according to the present invention, the charging depth of the silicon-based active material may be adjusted to a desirable level through the pre-lithiation process of the negative electrode and the adjustment of the charging and discharging SOC of the negative electrode, and thus the stress of the silicon-based active material may be reduced, and the volume expansion and contraction of the silicon-based active material may be minimized to achieve the excellent effect of smoothly maintaining a conductive network and improving the life performance.

In the present specification, the term "SOC" may refer to a state of charge of an electrode (positive electrode or negative electrode) or a secondary battery. The charge SOC of the pre-lithiated negative electrode may be the SOC of the negative electrode at the time when the electrochemical charging is completed in the operation of the secondary battery, and the discharge SOC of the pre-lithiated negative electrode may be the SOC of the negative electrode at the time when the electrochemical discharge is completed in the operation of the secondary battery.

The electrochemical charging and discharging of the secondary battery is performed so that a difference between the charge SOC and the discharge SOC of the pre-lithiated negative electrode is 18% to 32%. By adjusting the difference between the charge SOC and the discharge SOC of the pre-lithiated negative electrode within the above-described range, the charging depth and discharging terminal potential of the negative electrode including the silicon-based active material may be adjusted, and thus the deterioration in the performance of the negative electrode and the collapse of the electrode structure due to the volume expansion of the silicon-based active material may be minimized, and the high capacity, energy density and rapid charge performance of the silicon-based active material may be exhibited at an excellent level.

If the secondary battery is electrochemically charged and discharged such that the difference between the charge SOC and the discharge SOC of the pre-lithiated negative electrode is less than 18%, the use range of the silicon-based active material is small, and thus it is difficult to exhibit the capacity and life of the secondary battery. If the secondary battery is electrochemically charged and discharged such that the difference between the charge SOC and the discharge SOC of the pre-lithiated negative electrode is greater than 32%, there is a limitation in that the use range of the silicon-based active material increases, and thus the volume expansion and non-uniformity of the electrode increases, thereby sharply reducing cycle performance.

The electrochemical charging and discharging of the secondary battery may be performed so that the difference between the charge SOC and the discharge SOC of the pre-lithiated negative electrode is 19% to 27%, and when the difference is within the range, it is preferable in that the capacity characteristics of the silicon-based active material may be sufficiently exhibited and the cycle performance may be also improved.

The electrochemical charging of the secondary battery may be performed by using an electrochemical charger/discharger. Specifically, WOCS3000s (manufactured by WonATech Co., Ltd.) may be used as the electrochemical charger/discharger.

The SOC range for the pre-lithiated negative electrode may be adjusted in consideration of the charge and discharge SOC range of the secondary battery. For example, if the N/P ratio of the secondary battery is 2, the difference between the charge SOC and the discharge SOC of the secondary battery may be adjusted to 36% to 64%, thereby adjusting the difference between the charge SOC and the discharge SOC of the pre-lithiated negative electrode to 18% to 32%. That is, the electrochemical charging and discharging SOC range of the secondary battery is divided by the N/P ratio of the secondary battery, and thus it is possible to adjust the electrochemical charging and discharging SOC range of the pre-lithiated negative electrode. The charge SOC of the secondary battery may be adjusted by an electrochemical charger/discharger, a control unit of a battery system, BMS, etc.

During the electrochemical charging and discharging of the secondary battery, the charge SOC of the pre-lithiated negative electrode may be 35% to 50%, and specifically 45% to 50%. When the charge SOC is within said range, the stress applied to the silicon-based active material during charge and discharge may be reduced, and the degree of volume expansion and contraction of the silicon-based active material may be minimized to prevent a short circuit of the conductive network, and at the same time, an increase in a crystalline phase due to the excessive depth of charging, a deterioration in the silicon-based active material, etc. may be prevented to further improve the life performance of the secondary battery.

In addition, the present invention provides a battery system including the secondary battery. Specifically, the above-described method for charging and discharging a secondary battery may be implemented through the battery system.

For example, the secondary battery may be included in the battery system in the form of a secondary battery cell composed of a single secondary battery or a secondary battery module that is an assembly of a plurality of secondary batteries.

The battery system may include a control unit together with the secondary battery.

The control unit may set SOCs of the negative electrode and the secondary battery, an operating voltage range, etc. during the electrochemical charge and discharge of the secondary battery. Accordingly, the electrochemical charging and discharging of the secondary battery may be performed with the electrochemical charging and discharging range of the secondary battery, and the SOC of the secondary battery, which are set by the control unit, and the charge SOC and discharge SOC of the pre-lithiated negative electrode as described above may be adjusted.

The control unit is not particularly limited as long as it is capable of controlling the operating voltage range during the electrochemical charging and discharging of the secondary battery, and may be, for example, an electrochemical charger/discharger. Specifically, the control unit may be embedded in a battery management system (BMS) that is included in a battery pack.

In addition, the present invention provides a battery pack including the above-described battery system.

The battery pack may further include configurations known in the art, for example, BMS, a cooling system, and the like, in addition to the above-described secondary battery and the control unit.

The battery system or battery pack according to the present invention may be useful for portable devices, such as mobile phones, notebook computers, and digital cameras, electric vehicles such as hybrid electric vehicles (HEVs), and the like. The battery system or battery pack may be suitably applied to a power source requiring high power and large capacity, such as electric vehicles, hybrid electric vehicles, and power storage devices.

Hereinafter, examples of the present invention will be described in detail so that a person with ordinary skill in the art can easily carry out the present invention. The present invention may, however, be embodied in different forms and should not be construed as limited to the examples set forth herein.

PREPARATION EXAMPLE

Preparation Example 1: Preparation of Secondary Battery

<Pre-Lithiation of Negative Electrode>
1. Preparation of Negative Electrode (Before Performing Pre-Lithiation)

Si, a silicon-based active material [average particle diameter ($D_{50}$): 5 μm] as a negative electrode active material, carbon black (product name: Super C65, manufacturer: Timcal) as a conductive agent, and a polyacrylic acid as a binder were added to distilled water as a solvent for forming a negative electrode slurry in a weight ratio of 70:20:10 to prepare a negative electrode slurry (concentration of solid content: 20 wt %).

The negative electrode slurry was coated with a loading amount of 60 mg/25 cm² on one surface of a copper current collector (thickness: 15 μm) as a negative electrode current collector, and roll-pressed, and dried in a 130° C. vacuum oven for 10 hours to form a negative electrode active material layer, which made a negative electrode (negative electrode before performing pre-lithiation).

2. Pre-Lithiation of Negative Electrode

A pre-lithiation solution was prepared by adding $LiPF_6$ as a lithium salt at a concentration of 1 M to an organic solvent, in which ethylene carbonate (EC) and ethyl methyl carbonate (EMC) were mixed in a volume ratio of 30:70. The above prepared negative electrode was disposed in the pre-lithiation solution and then impregnated for 10 hours.

A lithium metal was disposed in the pre-lithiation solution to be spaced apart at a certain distance from the negative electrode.

Then, the negative electrode was electrochemically charged by using the lithium metal as a counter electrode. Specifically, the electrochemical charging was performed at a current density of 0.6 mA/cm² so that the charge capacity of the negative electrode before performing the pre-lithiation is 10%.

<Preparation of Positive Electrode>

$Li[Ni_{0.8}Co_{0.1}Mn_{0.1}]O_2$ as a positive electrode active material, carbon black (product name: Super C65, manufacturer: Timcal) as a conductive agent, and polyvinylidene fluoride (PVDF) as a binder were added in a weight ratio of 97:1.5:1.5 to N-methyl-2-pyrrolidone (NMP) as a solvent for forming a positive electrode slurry to prepare a positive electrode slurry (concentration of solid content: 78 wt %).

The positive electrode slurry was coated with a loading amount of 438 mg/25 cm² on each surface of an aluminum current collector (thickness: 12 μm) as a positive electrode current collector, and roll-pressed, and dried in a 130° C. vacuum oven for 10 hours to form a positive electrode active material layer, which made a positive electrode.

<Preparation of Secondary Battery>

The two pre-lithiated negative electrodes were respectively disposed on both sides of the prepared positive electrode, a polypropylene separator was interposed between the positive electrode and the negative electrode, and an electrolyte was injected to prepare a bi-cell type secondary battery. With respect to a total weight of the electrolyte, 3 wt % of vinylene carbonate was added to an organic solvent in which fluoroethylene carbonate (FEC) and diethyl carbonate (DEC) were mixed in a volume ratio of 30:70, and $LiPF_6$ as a lithium salt was added thereto at a concentration of 1M, and the resulting mixture was used as the electrolyte.

<Measurement of N/P Ratio>

(1) Calculation of Discharge Capacity Per Unit Area of Negative Electrode through Negative Electrode Sample A negative electrode sample was prepared in the same manner as the above except that the pre-lithiation was not performed. A lithium metal electrode having the same size as the negative electrode sample was prepared, and that faced the negative electrode sample. The polyethylene separator was interposed between the negative electrode sample and the lithium metal electrode, and then an electrolyte was injected to prepare a coin-type half-cell. $LiPF_6$ as a lithium salt was added at a concentration of 1 M to an organic solvent in which ethylene carbonate and ethyl methyl carbonate were mixed in a volume ratio of 50:50, and the resulting mixture was used as the electrolyte. A discharge capacity obtained by charging and discharging the coin-type half-cell at 0.1 C was divided by the area of the negative electrode sample to obtain a discharge capacity per unit area of the negative electrode before performing the pre-lithiation.

(2) Calculation of Discharge Capacity Per Unit Area of Positive Electrode through Positive Electrode Sample A positive electrode sample was prepared in the same manner as the above except for being prepared as a single-sided positive electrode. A lithium metal electrode having the same size as the positive electrode sample was prepared, and that faced the positive electrode sample. The polyethylene separator was interposed between the positive electrode sample and the lithium metal electrode, and then an electrolyte was injected to prepare a coin-type half-cell. $LiPF_6$ as a lithium salt was added at a concentration of 1 M to an organic solvent in which ethylene carbonate and ethyl methyl carbonate were mixed in a volume ratio of 50:50, and the resulting mixture was used as the electrolyte solution. A discharge capacity obtained by charging and discharging the coin-type half-cell at 0.1 C was divided by the area of the positive electrode sample to obtain a discharge capacity per unit area of the positive electrode.

(3) Calculation of N/P Ratio

The discharge capacity per unit area of the negative electrode before performing the pre-lithiation was divided by the discharge capacity per unit area of the positive electrode to obtain the N/P ratio (N/P ratio=2).

Preparation Example 2: Preparation of Secondary Battery

A secondary battery was prepared in the same manner as Preparation Example 1 except that the pre-lithiation process of the negative electrode in Preparation Example 1 was not performed.

The N/P ratio of the secondary battery in Preparation Example 2 measured in the same manner as in Preparation Example 1 was 2.

EXAMPLES

Examples 1-4 and Comparative Examples 1-3

<Preparation of Battery System>

The secondary batteries prepared in Preparation Examples 1 and 2 were connected to an electrochemical charger/discharger.

As Table 1 below, the types of secondary battery, and a charge SOC range of the secondary battery set in the control unit were adjusted as follows to prepare battery systems of Examples 1-4 and Comparative Examples 1-3.

TABLE 1

| | Preparation Example | N/P ratio | Set SOC (%) during electro-chemically charging secondary battery | Set SOC (%) during electro-chemically discharging secondary battery | Difference (%) between SOC during electro-chemically charging pre-lithiated negative electrode and SOC during electro-chemically discharging |
|---|---|---|---|---|---|
| Example 1 | 1 | 2 | 95 | 55 | 20 |
| Example 2 | 1 | 2 | 95 | 45 | 25 |
| Example 3 | 1 | 2 | 95 | 40 | 27.5 |
| Example 4 | 1 | 2 | 95 | 35 | 30 |
| Comparative Example 1 | 2 | 2 | 95 | 40 | 27.5 |
| Comparative Example 2 | 1 | 2 | 95 | 65 | 15 |
| Comparative Example 3 | 1 | 2 | 95 | 25 | 35 |

EXPERIMENTAL EXAMPLES

Experimental Example 1: In Situ Cycle Test

The battery systems prepared in Examples 1-4 and Comparative Examples 1-3 were electrochemically charged and discharged under the following conditions up to the set SOC in Table 1 above to operate the secondary batteries. The capacity retentions based on cycles were evaluated by the following equation. A graph of capacity retentions based on cycles in Examples 1-4 and Comparative Examples 1-3 is shown in FIG. 1, and capacity retentions at the $200^{th}$ cycle are listed in Table 2.

Capacity retention (%)={(discharge capacity at $N^{th}$ cycle)/(discharge capacity at first cycle)}×100

(where, N is an integer of 1 to 200)

<Conditions of Electrochemical Charging and Discharging>

Charging: charging in CC/CV mode at 1 C up to the charge SOC of the secondary battery in Table 1 above (cut off at 0.05 C)

Discharging: discharging in CC mode at 0.6 C up to the discharge SOC of the secondary battery in Table 1 above (cut off at the discharge voltage according to each SOC range)

TABLE 2

| | Capacity retention (%, @ $200^{th}$ cycle) |
|---|---|
| Example 1 | 95.8 |
| Example 2 | 96.3 |
| Example 3 | 93.6 |
| Example 4 | 92.8 |
| Comparative Example 1 | 88.5 |
| Comparative Example 2 | 86.3 |
| Comparative Example 3 | 85.8 |

Referring to FIG. 1 and Table 2, it can be confirmed that Examples 1-4, in which the difference between the charge SOC and the discharge SOC of the pre-lithiated negative electrode is adjusted to an appropriate level, exhibit excellent life performance as compared with Comparative Examples 1-3, in which the difference is not adjusted to an appropriate level.

Experimental Example 2: Reference Performance Test

In performing the charging and discharging under the set SOC in Table 1 and the conditions of Experimental Example 1, the capacity retentions were evaluated in the same manner as in Experimental Example 1 except that the charging and discharging were performed under the conditions of charging/discharging every 50 cycles, 1.0 C/0.5 C, 4.2 V to 3.0 V, and termination at 0.05 C.

A graph of capacity retentions based on cycles in Examples 1-4 and Comparative Examples 1-3 is shown in FIG. 2, and capacity retentions at the $200^{th}$ cycle are listed in Table 3.

TABLE 3

| | Capacity retention (%, @ $200^{th}$ cycle) |
|---|---|
| Example 1 | 98.3 |
| Example 2 | 96 |
| Example 3 | 93.1 |
| Example 4 | 90.7 |
| Comparative Example 1 | 89.4 |
| Comparative Example 2 | 83.8 |
| Comparative Example 3 | 87 |

Referring to FIG. 2 and Table 3, it can be confirmed that Examples 1-4, in which the difference between the charge SOC and the discharge SOC of the pre-lithiated negative electrode is adjusted to an appropriate level, exhibit excellent life performance as compared with Comparative Examples 1-3, in which the difference is not adjusted to an appropriate level.

Experimental Example 3: Evaluation of Resistance Increase Rates

Resistance increase rates were evaluated by measuring resistance every 50 cycles while performing the charging and discharging in the same manner as in Experimental Example 2.

After each secondary battery was charged at 0.33 C/4.25 V to 4.25 V/0.05 C under a constant current-constant voltage condition and discharged at 0.33 C to set a state of charge of the secondary battery to a SOC of 50%, a voltage drop, which was shown in a state in which each lithium secondary battery was subjected to a discharge pulse at a constant current of 2.5 C for 30 seconds, was measured to obtain resistance.

The resistance increase rates were calculated by the following equation, and a graph of the resistance increase rates based on cycles is shown in FIG. 3.

Resistance increase rate (%)={(resistance at $N^{th}$ cycle−resistance at first cycle)/(resistance at first cycle)}×100

(where, N is an integer of 1)

Referring to FIG. 3, it can be confirmed that the secondary batteries in Examples 1-4 have a small change in resistance increase rate as compared with Comparative Examples 2 and 3, which makes it possible to stably operate the secondary batteries.

Meanwhile, Comparative Example 1 has a small change in resistance increase rate, but has poor life performance compared with Examples 1-4 as described above.

Experimental Example 4: SEM Observation

The secondary batteries in Example 2 and Comparative Example 3 were charged and discharged under the same conditions as in Experimental Example 1, and the cross-sections of the negative electrodes at the $400^{th}$ cycle were observed through a scanning electron microscope (SEM). FIG. 4 shows a SEM photograph of Example 2, and FIG. 5 shows a SEM photograph of Comparative Example 3.

Referring to FIG. 4, it can be confirmed that the negative electrode in Example 2 has less collapse of the electrode structure after 400 cycles and the secondary battery was stably operated. Meanwhile, referring to FIG. 5, it can be confirmed that the negative electrode in Comparative Example 3 has collapse of the electrode structure on the upper layer part of the negative electrode after 400 cycles and the secondary battery was not stably operated.

The invention claimed is:

1. A method for charging and discharging a secondary battery, the method comprising:
   pre-lithiating a negative electrode comprising a silicon-based active material to form a pre-lithiated negative electrode;
   preparing a secondary battery comprising the pre-lithiated negative electrode, a positive electrode, a separator, and an electrolyte; and
   electrochemically charging and discharging the secondary battery with at least one cycle,
   wherein the electrochemical charging and discharging of the secondary battery are performed so that a difference between a charge SOC and a discharge SOC of the pre-lithiated negative electrode is 18% to 32%.

2. The method of claim 1, wherein the negative electrode is pre-lithiated by a method comprising steps (a), (b), and (c) below:
   (a) disposing and impregnating the negative electrode in the pre-lithiation solution;
   (b) disposing a lithium metal in the pre-lithiation solution to be spaced apart from the negative electrode; and
   (c) electrochemically charging the negative electrode by using the lithium metal as a counter electrode.

3. The method of claim 2, wherein the pre-lithiation solution comprises a lithium salt and an organic solvent.

4. The method of claim 2, wherein the electrochemical charging and discharging of the secondary battery is performed at a current density of 0.2 mA/cm² to 10 mA/cm².

5. The method of claim 2, wherein the negative electrode is pre-lithiated by being electrochemically charged by 5% to 50% of the charge capacity of the negative electrode.

6. The method of claim 1, wherein the silicon-based active material includes a compound represented by Chemical formula 1 below:

$SiO_x$, wherein 0≤x<2  [Chemical formula 1].

7. The method of claim 1, wherein the silicon-based active material comprises silicon.

8. The method of claim 1, wherein the silicon-based active material has an average particle diameter ($D_{50}$) of 0.1 μm to 12 μm.

9. The method of claim 1, wherein the negative electrode comprises:
   a negative electrode current collector; and
   a negative electrode active material layer disposed on at least one surface of the negative electrode current collector,
   wherein the negative electrode active material layer comprises the silicon-based active material.

10. The method of claim 9, wherein the negative electrode active material layer comprises 60 wt % or more of the silicon-based active material.

11. The method of claim 1, wherein an N/P ratio, calculated by Equation 1 below, of the negative electrode is 1.5 to 3.5:

N/P ratio=discharge capacity per unit area of negative electrode before performing pre-lithiation/discharge capacity per unit area of positive electrode  [Equation 1].

* * * * *